United States Patent [19]
Reccius

[11] Patent Number: 5,304,020
[45] Date of Patent: Apr. 19, 1994

[54] CUTTING TOOL FOR MAKING CYLINDRICAL BORES

[75] Inventor: Helmut Reccius, Munich, Fed. Rep. of Germany

[73] Assignee: Dornier Luftfahrt GmbH, Fed. Rep. of Germany

[21] Appl. No.: 15,988

[22] Filed: Feb. 10, 1993

[30] Foreign Application Priority Data

Feb. 14, 1992 [DE] Fed. Rep. of Germany ....... 4204428

[51] Int. Cl.⁵ .............................................. B23B 51/04
[52] U.S. Cl. ................................... 408/205; 408/229; 408/705; 408/713
[58] Field of Search ............... 408/204, 205, 703, 705, 408/199, 227, 229, 230, 206, 713

[56] References Cited

U.S. PATENT DOCUMENTS 989,379  4/1911  Mather .

FOREIGN PATENT DOCUMENTS 2316762 10/1974 Fed. Rep. of Germany .
3037097  8/1985 Fed. Rep. of Germany .
  34706  3/1983 Japan ................................... 408/204

Primary Examiner—Steven C. Bishop
Attorney, Agent, or Firm—Evenson, McKeown, Edwards & Lenahan

[57] ABSTRACT

A cutting tool for making cylindrical bores includes two or more cutting inserts and radially or approximately radially directed blades which leave an uncut core, as well as chip removal devices extending in the axial direction of the tool. The cutting tool is composed of at least two coaxial parts. One part forms the boring crown with the cutting inserts, and the other part forms the support for the boring crown with a clamping shank. The chip removal devices extend axially along both parts and lead radially to the outside.

9 Claims, 1 Drawing Sheet

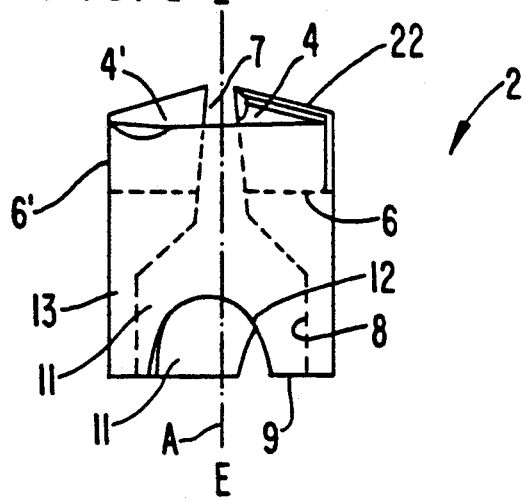
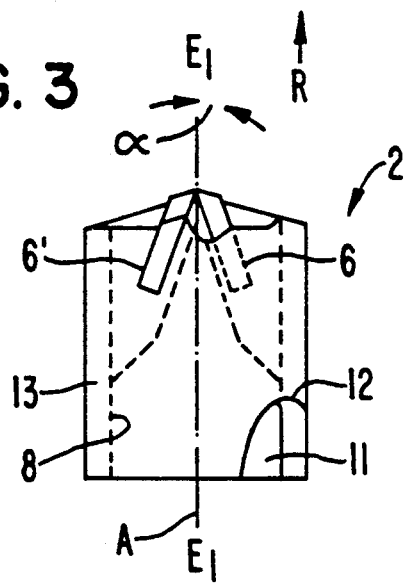
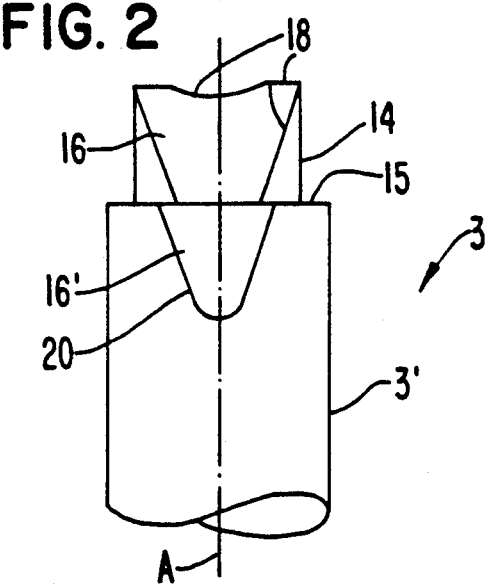
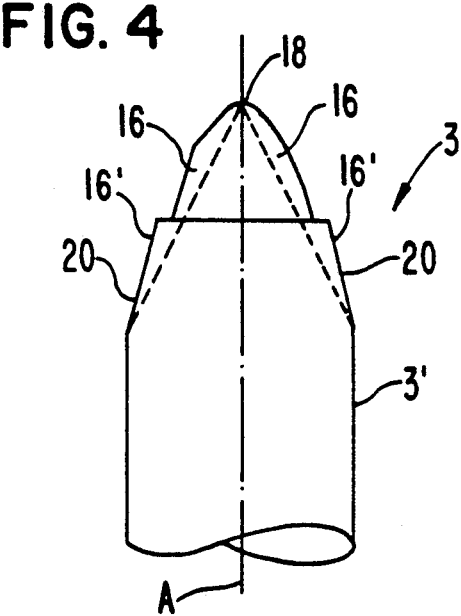
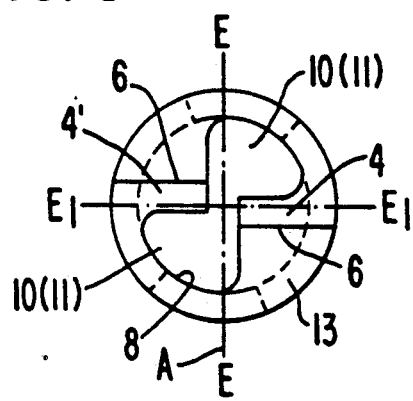

CUTTING TOOL FOR MAKING CYLINDRICAL BORES

BACKGROUND AND SUMMARY OF THE INVENTION

This invention relates to cutting tools for making cylindrical bores and, more particularly, to a cutting tool for making cylindrical bores including two or more cutting inserts with radially or approximately radially directed blades which leave an uncut core, and chip removal devices extending in the axial direction of the tool.

Boring tools are known for providing bore holes of a fairly large boring depth in the case of which the boring depth ratio of the boring depth "L" to the bore hole diameter "D" amounts to approximately L:D>5.

In the case of so-called deep-hole drilling, boring tools are used which, for the removal of boring chips, have a central chip removal duct inside a boring bar which is open in the direction of the boring advance.

For avoiding the hindering of the boring operation and damage to or destruction of the boring blades as well as damage to the bore wall, the removing of the boring chips and possibly of a boring core which remains uncut takes place by the feeding of a rinsing liquid between the bore hole wall and the boring blades of the tool.

The known German Patent Document DE-OS 23 16 762, for example, relates to such a boring tool. In this case, the discharge of the chips and possibly the discharge of a bore core which has remained uncut takes place by way of a central removal duct on the borer end or on the end of the boring bar carrying the boring tool.

The boring techniques applied by means of boring tools of the above-mentioned type require especially constructed machine tools with correspondingly adapted tool supports.

The present invention is based on known boring techniques whose advantageous method of operation consists of the fact that, during the boring, only a portion of the overall volume of the material must be cut while the central material portion in the form of a bore core which remains uncut is removed to the outside through the central duct of the boring bar. This reduces the boring power required for the boring and also considerably increases the tool life of the blades of the boring tool.

In comparison to the state of the art, it is the object of the invention to carry out, while using the known hollow drilling technique, the removal of the boring chips and of the bore core without the rinsing-in of liquid and without the use of machine tools of a special construction and not at the end of the boring bar of the boring tool.

This object is achieved by providing a cutting tool for making cylindrical bores including two or more cutting inserts with radially or approximately radially directed blades which leave an uncut core, and chip removal devices extending in the axial direction of the tool. The cutting tool is composed of at least two coaxial parts. One part forms the boring or cutting crown with the cutting inserts and the other part forms the support for the boring crown with a clamping shank. The chip removal devices extend axially along both parts and lead radially to the outside.

Because of the helical course of the chip removal ducts, the material which is cut during the boring operation, including the bore core which remains uncut, can be removed toward the rear and toward the outside without any impairment by the centrifugal forces occurring during the rotation of the boring tool and without the use of rinsing liquid.

The chip removal operation and the bore core removal is provided by the cutting inserts which are sloped with respect to one another and with respect to the longitudinal center plane of the tool.

As a result of the unimpaired removal of the cut material and of the bore core by way of lateral outlet openings of the removal ducts, perfect bore hole walls can be achieved.

The dividing of the boring tool into a cutting crown and a cutting crown support contributes to the fact that ducts of a relatively large width having a helical and radially outwardly directed course can be provided in the tool parts.

In addition, the tool is provided with a massive and stiff shank which can be clamped in with high radial forces by means of the normal clamping devices, such as three-jaw chucks, collet chucks, or the like.

Because of the removal of the cut material and of the bore core created during the boring operation by means of such tools through the chip removal openings in the radial direction, all chip removal machines with a separate drive that are customary in shops can use the tool according to the present invention.

An embodiment of a tool constructed according to the invention is illustrated in the drawing and will be described in detail by means of the following description.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic lateral view of the cutting crown part of the cutting tool according to the present invention in connection with cutting inserts;

FIG. 2 is a lateral view of the support accommodating the cutting crown part, the support being shown in a position that is rotated by an angular amount about the axis of rotation with respect to the cutting crown part;

FIG. 3 is a lateral view of the cutting crown part that is rotated by 90° with respect to FIG. 1;

FIG. 4 is a view of the support accommodating the cutting crown part of the cutting tool in a position that is rotated about the axis of rotation in comparison to FIG. 2; and FIG. 5 is a top view of the cutting tool showing the cutting inserts and the cutting crown part.

DETAILED DESCRIPTION OF THE DRAWINGS

FIGS. 1 and 2 as well as FIGS. 3 and 4 illustrate related tool parts in an exploded view.

In the case of the embodiment illustrated in the drawings, the cutting tool as a whole has the reference number 1 and comprises two interacting tool parts 2 and 3. The tool part 2 forms the receiving device for the cutting plates 4, 4' as the cutting crown, and part 3 forms the cutting crown support with its clamping shank 3'.

The cutting crown part 2 has grooves 6, 6', which extend radially in the direction of the axis of rotation A of the tool, for the receiving and holding of cutting plates 4, 4'. The grooves 6, 6' are arranged to be sloped by an angular amount a against the advancing direction R with respect to a longitudinal center plane $E_1$-$E_1$ of the tool 1 which contains the axis of rotation (FIG. 3). The cutting crown 2 is also provided with a central recess 7 which extends in the direction of the axis of rotation A and widens into chip chambers 10 (FIG. 5) on both sides of the plane $E_1$-$E_1$.

In the direction of the axis of rotation A, the chambers 10 change into ducts 11 which have a helically wound course.

In the area of its lower end, the cutting crown part 2 has a cylindrical recess 8 into which the cutting crown support 3 engages in a fitting manner by means of its cylindrical step 14. In the case of a cutting advance, the axial transmission of force takes place by way of the faces 9 or 15 of the crown part 2 or of the cutting crown support 3.

Driving cams, or the like, which are not shown here, are provided for the non-rotatable connection between the crown part 2 and the support 3.

The helically extending chip chambers 10 and the connecting chip removal ducts 11 which follow the chip chambers 10, with respect to the axis of rotation A of the tool 1, have a radially outwardly directed course and penetrate the ring cylinder wall 13 of the crown part 2 so that transition openings 12 are created. As a continuation of the ducts 11 of part 2, these openings 12 also lead into helical outwardly directed chip removal ducts 16, 16' in the circumferential surface of the support 3, in which case the chip removal ducts 16, 16' lead out into the open air by way of openings 20. The chip removal ducts 16, 16' are therefore machined into the cylindrically tapered step 14 and of the shank 3' of the support 3 in such a manner that the step 14 in the area of its upper end ends in the shape of a wedge or a blade 18 by means of which the chips are distributed to the chambers 10 and the ducts 11 as well as 16, 16'.

The cutting inserts 4, 4' are formed of a cutting material of a known type and have radially extended main cutting edges 22. The main cutting edges 22 of the two cutting inserts 4, 4' of the cutting crown 2 extend on both sides of the axis of rotation A radially in the common longitudinal center plane $E_1$-$E_1$ with a cutting effect that is directed in the rotating direction about the axis A.

However, it is easily also possible to provide more than two cutting inserts. In addition, as known, the cutting edges 22 may be situated relative to the longitudinal center plane $E_1$-$E_1$ in a parallel advancing or lagging position. As known, the cutting plates 4, 4' are each arranged at the same distance from the axis of rotation A so that an uncut core remains during the cutting operation which is removed to the outside by way of the chip chambers 10 and the chip removal ducts 11 of the crown part 2 as well as by way of the connecting chip removal ducts 16, 16' of the support 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cutting tool for making cylindrical bores, comprising:

at least two cutting inserts having approximately radially directed blades which in use leave an uncut core;

chip removal devices extending in an axial direction of the cutting tool;

wherein the cutting tool comprises at least two coaxial parts, a first of said parts forming a cutting crown including the cutting inserts and a second of said parts forming a support for the cutting crown including a clamping shank; and wherein the chip removal devices extend axially along both parts and lead radially to the outside of the cutting tool.

2. A cutting tool according to claim 1 having an axis of rotation, wherein the cutting inserts of the cutting crown, with their cutting edges which are radial with respect to the axis of rotation, are arranged to be sloped by an angular amount with respect to a longitudinal center plane containing the axis of rotation.

3. A cutting tool according to claim 1, wherein the chip removal devices comprise chip chambers and crown chip removal ducts in the cutting crown and crown support chip removal ducts in the cutting crown support, at least one of said chip chambers, crown chip removal ducts and crown support chip removal ducts have a helical and outwardly directed course with a connection to outlet openings.

4. A cutting tool according to claim 2, wherein the chip removal devices comprise chip chambers and crown chip removal ducts in the cutting crown and crown support chip removal ducts in the cutting crown support, at least one of said chip chambers, crown chip removal ducts and crown support chip removal ducts have a helical and outwardly directed course with a connection to outlet openings.

5. A cutting tool according to claim 3, wherein the cutting crown support has one of a wedge and blade shape at least in an area of its upper end, the shape being aligned such that its wedge faces each face the chip chambers or the crown chip removal ducts of the crown part.

6. A cutting tool according to claim 4, wherein the cutting crown support has one of a wedge and blade shape at least in an area of its upper end, the shape being aligned such that its wedge faces each face the chip chambers or the crown chip removal ducts of the crown part.

7. A cutting tool according to claim 5, wherein the crown support chip removal ducts are machined into the wedge or blade faces of the cutting crown support, said crown support chip removal ducts interacting with the crown chip removal ducts of the cutting crown and form a closed duct.

8. A cutting tool according to claim 6, wherein the crown support chip removal ducts are machined into the wedge or blade faces of the cutting crown support, said crown support chip removal ducts interacting with the crown chip removal ducts of the cutting crown and form a closed duct.

9. A cutting tool according to claim 1, wherein the cutting crown support and the cutting crown are constructed to be able to be fitted together via a coaxial plug-type connection comprising a cylindrical recess and a cylindrical pin, the coupling of the parts takes place in the operating direction about the axis of rotation via a wedge-shaped section of the support and stops at the cutting crown.

* * * * *